United States Patent
Ambrogi et al.

(10) Patent No.: US 8,940,352 B2
(45) Date of Patent: Jan. 27, 2015

(54) FROZEN AERATED CONFECTION AND METHOD OF PRODUCTION

(75) Inventors: Mario Ambrogi, Parma (IT); Stefano Bertini, Pharma (IT)

(73) Assignee: Nestec S.A., Vevey (CH)

( * ) Notice: Subject to any disclaimer, the term of this patent is extended or adjusted under 35 U.S.C. 154(b) by 1901 days.

(21) Appl. No.: 10/598,444

(22) PCT Filed: Feb. 17, 2005

(86) PCT No.: PCT/EP2005/001614
§ 371 (c)(1),
(2), (4) Date: Nov. 13, 2006

(87) PCT Pub. No.: WO2005/084454
PCT Pub. Date: Sep. 15, 2005

(65) Prior Publication Data
US 2007/0202231 A1    Aug. 30, 2007

(30) Foreign Application Priority Data
Mar. 1, 2004 (EP) .................................... 04 004755

(51) Int. Cl.
*A23G 9/00*     (2006.01)
*A23L 1/308*    (2006.01)
*A23G 9/34*     (2006.01)

(52) U.S. Cl.
CPC ................. *A23L 1/3081* (2013.01); *A23G 9/00* (2013.01); *A23G 9/34* (2013.01)
USPC .......................................... 426/565; 426/100

(58) Field of Classification Search
CPC ............ A23G 9/00; A23G 9/34; A23L 1/3081
USPC .................................................. 426/565, 100
See application file for complete search history.

(56) References Cited

U.S. PATENT DOCUMENTS

| 4,427,701 A | 1/1984 | Morley |
| 4,552,773 A | 11/1985 | Kahn et al. |
| 5,127,956 A * | 7/1992 | Hansen et al. .................. 127/42 |
| 5,358,729 A | 10/1994 | Ohkuma et al. |
| 2003/0113436 A1 | 6/2003 | Fukinbara et al. |

FOREIGN PATENT DOCUMENTS

| EP | 0965277 | 12/1999 |
| EP | 1321043 | 6/2003 |
| FR | 2779913 | 12/1999 |
| GB | 1508437 A * | 4/1978 |
| GB | 2304524 | 3/1997 |
| WO | WO 01/06865 | 2/2001 |

OTHER PUBLICATIONS

Schaller-Povolny, L. et al., "Viscosity and Freezing Point of a Reduced Fat Ice Cream Mix As Related to Inulin Content," Biosciences Information Service, 2001.
Wuters, R., "Technological and Nutritional Advances in Ice Cream Production," International Food Information Service, 1999.
El-Nagar, G. at al., "Rheological Quality and Stability of YOG-Ice Cream With Added Inluin," International Food Information Service, 2002.
L Schaller et al., "Sensory Attributes and Storage Life of Reduced Fat Ice Cream as Related to Inulin Content," Journal of Food Science, vol. 64, No. 3, 1999, pp. 555-559, XP002488984.

\* cited by examiner

*Primary Examiner* — Jyoti Chawla
(74) *Attorney, Agent, or Firm* — K&L Gates LLP

(57) ABSTRACT

Frozen aerated packaged ice confection with very high softness at −18° C. which keeps this property without shrinkage or layering up to the final consumer over the product shelf life contains polyol and vegetable fiber.

17 Claims, No Drawings

FROZEN AERATED CONFECTION AND METHOD OF PRODUCTION

FIELD OF THE INVENTION

The present invention is related to a frozen aerated packaged ice confection with very high softness at −18° C. and which keeps this property without shrinkage or layering up to the final consumer over the product shelf life.

BACKGROUND OF THE INVENTION

There is a problem in achieving stability of a very soft ice cream packed in cups or bulk containers.

Inside the ice cream there are ice crystals and air bubbles dispersed in a liquid phase. Softness generally is obtained by reducing the quantity of ice formed and this is mainly obtained by selecting the type and the amount of sugars, by adding salt or alcohol in the ice cream mix. There is some limitation in the possibilities to play with the low molecular components mentioned above for taste reasons. Thus, if further increase of softness is targeted, the only possibility is to use polyols, e.g. glycerol which increases the risk of shrinkage. Shrinkage is a serious problem which makes the product unacceptable to the consumer: the volume of the ice cream shrinks, leaving a space either at the top or at the side of the package, which then appears unfull.

Unfortunately, the problem of instability raises with the volume of the liquid phase. Without willing to be bound by theory, when the volume of the liquid phase raises, the air bubbles have a tendency to go up which may lead to the formation of a layer of ice at the bottom of the container: this default is called layering.

In WO 01/06865 a solution to the problem of improved texture and stability of soft serve ice cream, in particular resistance to heat shock is obtained by creating fine and stable air cells with the aid of a specific blend of emulsifiers comprising propylene glycol monostearate, sorbitan tristearate and unsaturated monoglycerides.

EP-A-1 321 043 relates to a frozen aerated ice cream which has a soft structure at −18° C., contains high amounts of freezing point depressing sugars and contains less than 0.5% by weight glycerol. Since it is for use with soft serve ice dispensing devices which comprise extrusion of cartridges containing the soft ice cream on the place of consumption, shrinkage is not an issue since the consumer would not notice it.

The purpose of the invention is to achieve stabilization of soft serve ice cream type of product for home use with high resistance to shrinkage and layering.

SUMMARY OF THE INVENTION

The present invention thus concerns an aerated frozen confection which is resistant to shrinkage and is soft down to common storage temperature in home freezers of −18° C. or less, characterized in that it comprises by weight:
50 to 70% water,
5 to 20% fat,
1% or more polyol,
0.5 to 7% vegetable fibre selected from the group consisting of oat fibres, fibres extracted from chicory taproots and fibregum from Acacia tree, the balance being sugars, milk proteins, hydrocolloids and emulsifiers and has an overrun of 20 to 200%.

Preferably, the product of the invention contains 2 to 8% by weight proteins. Preferably the proteins are of milk origin and come from liquid skimmed milk, skimmed milk powder and whey powder, optionally recombined in water. Preferably, whole or part of the protein source, should undergo only one pasteurisation step before the use in mix preparation, in order to minimize thermal denaturation of proteins. Thus milk solid non fat aid in providing the desirable properties of whipability, smoothness, body and melt resistance.

In the context of the invention, a suitable polyol can be selected from the group consisting of sorbitol, mannitol, lactitol, xylitol, maltitol and glycerol, glycerol being preferred. The role of polyol is to further soften the frozen confection by making it sufficiently soft to be scoopable at home freezer temperature of −18° C. or less. It is used to increase softness because it reduces ice content with less sweetening effect that sucrose.

Preferably, glycerol is used at a level of 1 to 5% by weight.

"Vegetable fibres" which are contemplated in the invention mean fibres selected from the group consisting of oat fibres, fibres extracted from chicory taproots and fibregum from Acacia tree. Preferably they consist in fructo-oligosaccharides, most preferably they are inulin-oligofructoses extracted from chicory. Most preferably, inulin-oligofructoses are used at a level of 2 to 4% by weight. We have found that it has a strong effect to prevent shrinkage and ice layering, also in the presence of glycerol.

Preferably, the product of the invention comprises sweetener ingredients which are a combination of sucrose, dextrose and glucose syrup, preferably from glucose syrup solids from corn or wheat, that provide a desired level of sweetness and texture and decrease the freezing point of the mixture.

The fat may be of milk or vegetable origin and its level may be within a broad range. If less fat is used in combination with a polyol and vegetable fibre, it is then possible to manufacture a cheaper ice cream or an ice cream which is more dietetic with the same softness as a regular high fat ice cream.

Another advantage achieved by the invention is that live probiotic lactic acid bacteria, can be incorporated, e.g. in encapsulated form or in the form of separately cultured portion of the milk solid non fat which is added to the mix, in this latter case after pasteurisation. These probiotic bacteria can thus act in combination with the fermentescible prebiotic vegetable fibres to provide upon consumption a beneficial positive influence on the development of the intestinal flora with the consumer.

The invention further concerns a method for producing an aerated frozen confection as described above, characterized in that it comprises the steps of
premixing vegetable fibre with water and adding the other powdery and liquid ingredients in an agitated mixing tank,
subjecting the mix to a heating step to hydrate the hydrocolloids,
pasteurising the heated mix,
homogenising the pasteurised mix,
cooling, ageing and freezing the mix whilst aerating,
packaging and hardening the mix.

Preferably, the freezing step is carried out in a scraped surface freezer at a draw temperature at the freezer outlet of −5 to −10°, most preferably at a draw temperature as low as possible of about −9 to −10° C.

The invention finally also concerns the use of vegetable fibre selected from the group consisting of oat fibres, fibres extracted from chicory taproots and fibregum from Acacia tree in combination with a polyol for improving softness and stability against shrinkage of an ice confection which contains 5 to 20% by weight fat.

DETAILED DESCRIPTION OF THE INVENTION

The present invention will be further illustrated in the following examples wherein, unless indicated otherwise, the percentages are by weight.

The softness character in the context of the invention is determined according to the following test:

The force is measured to vertically penetrate a spoon 1 cm deep into the ice cream in the centre of the ice cream mass, at −18° C. The scores thus range from "not firm, 0" to "very firm, 5" and thus gives the softness index. The softness is considered insufficient with a score of 5, when the spoon has difficulties to penetrate the ice cream; a softness of 1 to 3 is considered to meet the goal of the invention.

Shrinkage is the partial or total loss of the air incorporated in the ice cream. Shrinkage typically occurs during ice cream storage, in particular when the ice cream is exposed to high temperature and/or temperature oscillation. Due to shrinkage, the ice cream volume is reduced, the shape can be affected and, over a determinate level of shrinkage, the products are unmarketable. A good resistance to shrinkage therefore is a key property of an ice cream.

The capability of different products to keep their volume over commercial shelf-life (that means to resist shrinkage) can simply be compared by application of accelerated heat shock cycles to be run in thermostatic chambers and visually evaluating the changes of their appearances.

Thus a very specific heat shock cycle to enhance the shrinkage sensitivity of different products is described hereafter

| PHASE (No.) | FROM (° C.) | TO (° C.) | TIME (minutes) |
|---|---|---|---|
| 0 | −20 | CONST. | 240' |
| 1 | −20 | −8 | 30' |
| 2 | −8 | CONST. | 540' |
| 3 | −8 | −20 | 30' |
| 4 | −20 | CONST. | 120' |
| 5 | −20 | −8 | 30' |
| 6 | −8 | CONST. | 540' |
| 7 | −8 | −15 | 30' |
| 8 | −15 | CONST. | 120' |
| 9 | −15 | −4 | 60' |
| 10 | −4 | −10 | 60' |
| 11 | −10 | −4 | 60' |
| 12 | −4 | −10 | 60' |
| 13 | −10 | −4 | 60' |
| 14 | −4 | −10 | 60' |
| 15 | −10 | −4 | 60' |
| 16 | −4 | −10 | 180' |
| 17 | −10 | −4 | 2.160' |
| 18 | −4 | −30 | 10' |

The overrun is expressed as a percentage by volume and defined as the percentage by which the volume of the liquid mix for a product is increased with air during whipping and freezing.

EXAMPLES

Ice confections were formulated and produced according to the following processing conditions:

Vegetable fibre is mixed with some sugar or predispersed in some water at temperature of 45° C. and added with all the powdery ingredients to liquid ingredients and glycerol in an agitated mixing tank.

Once all ingredients have been thoroughly blended together, the mixture was heated at 65° C. for 20 min. in order to hydrate the hydrocolloids.

For pasteurisation, the mixture was then heated to a temperature of 87° C. for 24 s. to achieve satisfactory treatment to confirm public health requirements and also avoiding as much as possible any significant denaturation of proteins.

The mixture was then subjected to an homogenisation stage to reduce the dimensions of the fat droplets, by homogenising the mixture at a pressure of 120 to 160 bar, at a temperature of 70 to 85° C. The homogenised mix was rapidly cooled to chill temperatures, typically +4° C. and then aged by holding it for 4 to 24 h at that temperature.

The mixture was frozen using ice cream continuous freezer known as srapped surface heat exchangers where it was aerated by incorporating sufficient air to give the desired overrun. The ice confections were frozen down to draw temperatures lower than −6° C., typically of −8 to −10° C.

After being extruded together with an aromatised sauce of 45 to 55% sugar content, topped with inclusions (for decoration) and packed into transparent plastic cups closed with transparent lids, the products were subjected to hardening in a hardening tunnel and stored at −30° C.

Formulations of examples 1-4 indicated in table 1 below concern the ice creams packed into cardboard cup without the sauce and inclusions.

TABLE 1

| | Composition % | | | |
|---|---|---|---|---|
| Component | Example 1 | Example 2 | Example 3 | Example 4 |
| Fat (cocoa fat and monodi-glyceride excluded) | 6.1 | 5.6 | 5.1 | 14.5 |
| Non-fat milk solids (from liquid skim milk and skim milk powder) | 5.6 | 4.7 | 6.3 | 5.5 |
| Whey solids | 2.9 | 1.9 | 2.4 | 1.9 |
| Sucrose | 6.5 | 6.5 | 12 | 8 |
| Glucose syrup solids (DE = 60, 80% solids, from wheat) | 15.2 | 11.2 | 7.2 | 0.8 |
| Dextrose | 0.9 | 6.4 | 1.8 | 6.9 |
| Locust bean gum | 0.18 | 0.12 | 0.2 | 0.1 |
| Guar gum | 0.09 | 0.06 | 0.1 | 0.05 |
| Carrageenan | 0.03 | 0.03 | 0.03 | 0.03 |
| Mono-diglycerides | 0.2 | 0.2 | 0.2 | 0.4 |
| Glycerol | 2.5 | 3 | 1 | 5 |
| Vegetable fibre (Inulin, Fibruline ®, Cosucra) | 1.9 | 1.4 | 2.9 | 5.8 |
| Cocoa powder | — | 5.3 | — | — |
| Water | 57.9 | 53.6 | 60.8 | 51 |
| Total solids | 42.1 | 46.4 | 39.2 | 49 |

The products of examples 1 to 4 were very soft with softness indexes of 1 to 2, in contrast to regular ice cream rating 4. Their overrun is 143-147%.

Samples of cylindrical shape were taken out of the freezer cabinet at a temperature of −18° C. and checked after 30 min. and respectively 60 min. at room temperature (24° C.) for volume loss, compared to:

Comparison 1: an ice cream with glycerol to increase softness in comparison to regular ice cream and Comparison 2: a regular ice cream with no glycerol and no vegetable fibre.

The products of examples 1 to 4 were found to have a resistance to shrinkage comparable to comparison 2 (regular ice cream) after 4 cycles as defined hereinbefore with almost no deformation and no apparent shrinkage.

In contrast thereto, comparison 1 showed severe deformation by shrinkage which made the product commercially unacceptable.

The invention claimed is:

1. An aerated frozen confection comprising:
   50 to 70% by weight water,
   5 to 20% by weight fat,
   1% by weight or more polyol,
   0.5 to 7% by weight vegetable fiber selected from the group consisting of oat fibers, fibers extracted from chicory taproots and combinations thereof, and
   sugars, milk proteins, hydrocolloids and emulsifiers and the confection having an overrun of 20 to 200%, the aerated frozen confection being resistant to shrinkage and soft down to a storage temperature of −18° C. or less.

2. The aerated frozen confection according to claim 1, comprising 2 to 8% by weight proteins derived from milk.

3. The aerated frozen confection according to claim 1, wherein the polyol is glycerol.

4. The aerated frozen confection according to claim 3, wherein the level of glycerol is 1 to 5% by weight.

5. The aerated frozen confection according to claim 1, wherein the vegetable fibers are oligosaccharides derived from chicory, at a level of 2 to 4% by weight.

6. The aerated frozen confection according to claim 1, wherein the confection has an overrun of 90 to 160%.

7. A method for producing an aerated frozen confection, the method comprising:
   premixing vegetable fiber selected from the group consisting of oat fibers, fibers extracted from chicory taproots and combinations thereof, and adding the mixture to an agitated mixing tank along with fat, polyol, sugar, milk, protein, hydrocolloids, and emulsifiers,
   subjecting the mix to a heating step to hydrate the hydrocolloids,
   pasteurizing the heated mix,
   homogenizing the pasteurized mix,
   cooling, ageing and freezing the mix whist aerating, and
   packaging and hardening the mix to produce the aerated frozen confection, the aerated frozen confection being resistant to shrinkage and soft down to a storage temperature of −18° C. or less.

8. The method according to claim 7, wherein the pasteurizing step is carried out during about 24 to 30 seconds at about 90° C. to 80° C.

9. The method according to claim 7, wherein the homogenizing step is carried out at about 70° C. at a pressure of about 120 to 160 bar.

10. The method according to claim 7, wherein the freezing step is carried out in a scraped surface freezer at a draw temperature of −5 to −10° C.

11. The method according to claim 7, wherein the polyol is glycerol.

12. The method according to claim 11, wherein the level of glycerol is 1 to 5% by weight.

13. A method of producing confection products, the method comprising:
   using a vegetable fiber selected from the group consisting of oat fibers, fibers extracted from chicory taproots and combinations thereof, in combination with a polyol to produce an ice confection that contains 5 to 20% by weight fat, the ice confection being resistant to shrinkage and soft down to a storage temperature of −18° C. or less.

14. The method according to claim 13, wherein the polyol is glycerol.

15. The method according to claim 14, wherein the level of glycerol is 1 to 5% by weight.

16. An aerated frozen confection comprising:
   50 to 70% by weight water,
   5 to 20% by weight fat,
   at least 1% or more glycerol,
   0.5 to 7% by weight vegetable fiber selected from the group consisting of oat fibers, fibers extracted from chicory taproots and combinations thereof, and
   sugars, milk proteins, hydrocolloids and emulsifiers, the aerated frozen confection being resistant to shrinkage and soft down to a storage temperature of −18° C. or less.

17. The aerated frozen confection according to claim 16, wherein the level of glycerol is 1 to 5% by weight.

* * * * *